United States Patent
Lee et al.

(10) Patent No.: US 9,728,792 B2
(45) Date of Patent: Aug. 8, 2017

(54) ION EXCHANGE MEMBRANE FILLING COMPOSITION, METHOD OF PREPARING ION EXCHANGE MEMBRANE, ION EXCHANGE MEMBRANE, AND REDOX FLOW BATTERY

(71) Applicant: Samsung Electronics Co., Ltd., Gyeonggi-do (KR)

(72) Inventors: Myung-jin Lee, Seoul (KR); Joung-won Park, Seongnam-si (KR); Jun-young Mun, Seoul (KR); Duk-jin Oh, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/710,994

(22) Filed: May 13, 2015

(65) Prior Publication Data
US 2015/0249253 A1    Sep. 3, 2015

Related U.S. Application Data

(62) Division of application No. 13/562,574, filed on Jul. 31, 2012, now abandoned.

(30) Foreign Application Priority Data

Nov. 3, 2011 (KR) .................. 10-2011-0114123

(51) Int. Cl.
*H01M 8/02* (2016.01)
*B01J 41/00* (2006.01)
(Continued)

(52) U.S. Cl.
CPC .......... *H01M 8/0291* (2013.01); *B01J 41/00* (2013.01); *B01J 47/12* (2013.01); *H01M 8/0289* (2013.01);
(Continued)

(58) Field of Classification Search
CPC ....... H01M 2300/0082; H01M 8/1004; H01M 4/881; H01M 4/8605; H01M 4/8828;
(Continued)

(56) References Cited

U.S. PATENT DOCUMENTS

| 4,468,441 A | 8/1984 | D'Agostino et al. |
| 5,145,618 A | 9/1992 | MacDonald et al. |

(Continued)

FOREIGN PATENT DOCUMENTS

| CN | 101337999 A | 1/2009 |
| CN | 101853947 A | 10/2010 |

(Continued)

OTHER PUBLICATIONS

Derwent Abstract US 20100003574.*

(Continued)

*Primary Examiner* — Alex Usyatinsky
(74) *Attorney, Agent, or Firm* — Cantor Colburn LLP

(57) ABSTRACT

A composition for filling an ion exchange membrane, a method of preparing the ion exchange membrane, the filled ion exchange membrane, and a redox flow battery using the filled ion exchange membrane. The composition includes an ion conductive material and a water soluble support.

11 Claims, 5 Drawing Sheets

(51) Int. Cl.
*H01M 8/1044* (2016.01)
*H01M 8/1058* (2016.01)
*H01M 8/18* (2006.01)
*B01J 47/12* (2017.01)
*H01M 8/20* (2006.01)
*H01M 8/0289* (2016.01)
*H01M 8/1004* (2016.01)
*H01M 8/1053* (2016.01)
*H01M 4/88* (2006.01)
*H01M 4/86* (2006.01)
*C08J 5/22* (2006.01)
*H01M 4/36* (2006.01)
*B01J 41/08* (2017.01)
*H01M 2/16* (2006.01)

(52) U.S. Cl.
CPC ....... *H01M 8/1044* (2013.01); *H01M 8/1058* (2013.01); *H01M 8/188* (2013.01); *H01M 8/20* (2013.01); *B01J 41/08* (2013.01); *C08J 5/22* (2013.01); *H01M 2/16* (2013.01); *H01M 4/36* (2013.01); *H01M 4/8605* (2013.01); *H01M 4/881* (2013.01); *H01M 4/8828* (2013.01); *H01M 8/1004* (2013.01); *H01M 8/1053* (2013.01); *H01M 2300/0082* (2013.01); *Y02E 60/522* (2013.01); *Y02E 60/523* (2013.01); *Y02E 60/528* (2013.01)

(58) Field of Classification Search
CPC .... H01M 8/1053; H01M 4/044; H01M 4/041; H01M 2/16; H01M 4/36; H01M 8/1044; H01M 8/1058; B01J 41/12; B01J 41/08; B01J 41/00; C08J 5/22
See application file for complete search history.

(56) References Cited

U.S. PATENT DOCUMENTS

| | | |
|---|---|---|
| 5,626,988 A | 5/1997 | Daniel-Ivad et al. |
| 5,958,997 A | 9/1999 | Eunkyoung et al. |
| 5,998,058 A | 12/1999 | Fredley |
| 6,130,175 A | 10/2000 | Rusch et al. |
| 6,248,469 B1 | 6/2001 | Formato et al. |
| 6,764,789 B1 | 7/2004 | Sekiguchi et al. |
| 6,841,283 B2 | 1/2005 | Breault |
| 7,008,723 B2 | 3/2006 | Daniel-Ivad et al. |
| 7,125,626 B2 | 10/2006 | Kato |
| 7,344,791 B1 | 3/2008 | Yamaguchi et al. |
| 2005/0118479 A1 | 6/2005 | Yamaguchi et al. |
| 2006/0065522 A1 | 3/2006 | Liu et al. |
| 2006/0234129 A1 | 10/2006 | Ovshinsky et al. |
| 2008/0020255 A1 | 1/2008 | Hiraoka et al. |
| 2009/0068531 A1* | 3/2009 | Sawa .................... C08J 5/2256 429/417 |
| 2010/0003574 A1* | 1/2010 | Isomura ................ C08J 5/2231 429/480 |
| 2010/0003586 A1 | 1/2010 | Sahu |
| 2011/0189549 A1 | 8/2011 | Sun et al. |
| 2012/0034481 A1 | 2/2012 | Higa et al. |
| 2012/0135278 A1* | 5/2012 | Yoshie .................. H01M 8/188 429/7 |
| 2012/0285881 A1 | 11/2012 | Jikihara et al. |

FOREIGN PATENT DOCUMENTS

| | | |
|---|---|---|
| JP | 6122574 A | 1/1986 |
| JP | 09223513 A | 8/1997 |
| JP | 2008204647 A | 9/2008 |
| JP | 200916090 A | 1/2009 |
| JP | 2009093998 A | 4/2009 |
| JP | 201154445 A | 3/2011 |
| JP | 2011526830 A | 10/2011 |
| KR | 1019980015054 A | 5/1998 |
| KR | 1020100116888 A | 11/2010 |
| KR | 1020110088881 A | 8/2011 |
| WO | 2010117036 A1 | 10/2010 |
| WO | WO 2010143634 * | 12/2010 |
| WO | 2011081145 A1 | 7/2011 |

OTHER PUBLICATIONS

Extended European Search Report for Application No. 12181563.3-1359 dated Feb. 19, 2013.
Jaeger, et al., Synthetic polymers with quaternary nitrogen atoms-Synthesis and structure of the most used type of cationic polyelectrolytes, Progress in Polymer Science 35 (2010) pp. 511-577.
Japanese office action for patent application No. 2012-194795 mailed on May 30, 2016, citing the above reference(s).
Chinese Office Action for CN Application No. 201210392476.5, Filing Date: Oct. 16, 2012; Office Action Issue Date Nov. 19, 2015; 7 pages (Also English Translation).
Chinese Office Action for Application No. 201210392476.5 mailed on Dec. 30, 2016, citing the above reference(s).

* cited by examiner

ION EXCHANGE MEMBRANE FILLING COMPOSITION, METHOD OF PREPARING ION EXCHANGE MEMBRANE, ION EXCHANGE MEMBRANE, AND REDOX FLOW BATTERY

CROSS-REFERENCE TO RELATED APPLICATION

This application is a divisional application of U.S. patent application having Ser. No. 13/562,574 filed on Jul. 31, 2012, and claims the benefit of Korean Patent Application No. 10-2011-0114123, filed on Nov. 3, 2011 in the Korean Intellectual Property Office, the disclosure of which is incorporated herein in its entirety by reference.

BACKGROUND

1. Field

Aspects of the present invention relate to ion exchange membrane filling compositions, methods of manufacturing ion exchange membranes, ion exchange membranes, and redox flow batteries, and more particularly, to ion exchange membrane filling compositions including ion conductive materials and water soluble supports, methods of preparing ion exchange membranes by using the ion exchange membrane filling compositions, ion exchange membranes prepared by using the methods, and redox flow batteries including the ion exchange membranes.

2. Description of the Related Art

A typical secondary battery converts electric energy input thereto by changing the electric energy into chemical energy and then stores the chemical energy. Then, during discharging, the battery converts the stored chemical energy into electric energy and then outputs the electric energy.

Like the typical secondary battery, a redox flow battery also converts electric energy input thereto by changing the electric energy into chemical energy and then stores the chemical energy. Then, during discharging, the redox flow battery converts the stored chemical energy into electric energy and outputs the electric energy. However, the redox flow battery is different from the typical secondary battery in that because an electrode active material retaining energy is present in a liquid state, not in a solid state, a tank for storing the electrode active material is needed.

In detail, in a redox flow battery, a catholyte and an anolyte each function as an electrode active material, and a typical example of these electrolytes is a transition metal oxide solution. That is, in a redox flow battery, the catholyte and the anolyte are stored in a tank in the form of a solution including a redox transition metal in which the oxidation state is changed.

Also, in a redox flow battery, a cell for generating electric energy has a structure of cathode/ion exchange membrane/anode, and the catholyte and anolyte supplied to the cell via a pump contact corresponding electrodes, respectively. At the respective contact surfaces, transition metal ions included in the respective electrolytes are oxidized or reduced. At this point, an electromotive force corresponding to the Gibbs free energy is generated. In this case, the electrodes do not directly participate in the reactions and only aid oxidation/reduction of transition metal ions included in the catholyte and the anolyte.

In a redox flow battery, the ion exchange membrane does not participate in the reactions and performs (i) a function of quickly transferring ions that constitute a charge carrier between the catholyte and the anolyte, (ii) a function of preventing direct contact between a cathode and an anode, and most importantly (iii) a function of suppressing crossover of electrolyte active ions that are dissolved in the catholyte and the anolyte and directly participate in the reactions.

However, a conventional ion exchange membrane for a redox flow battery is mainly used to selectively separate ions in an aqueous system, and accordingly, ion mobility characteristics and film properties in the aqueous solution are optimized. However, an ion exchange membrane for a redox flow battery that has optimized ion mobility characteristics and film properties in a non-aqueous system, that is, an organic system, has not yet been sufficiently studied.

SUMMARY

Aspects of the present invention provide ion exchange membrane filling compositions including ion conductive materials and water soluble supports.

Aspects of the present invention provide methods of preparing ion exchange membranes by using the ion exchange membrane filling compositions.

Aspects of the present invention provide ion exchange membranes prepared by using the methods.

Aspects of the present invention provide redox flow batteries including the ion exchange membranes.

According to an aspect of the present invention, a composition for filling an ion exchange membrane includes: an ion conductive material; and a water soluble support.

The ion conductive material may include at least one compound selected from the group consisting of an ion conductive monomer and an ion conductive polymer.

The ion conductive monomer may include a quaternary ammonium salt.

The quaternary ammonium salt may include at least one of poly(diallyldimethylammonium chloride), poly(acrylamide-co-diallyldimethylammonium chloride), and poly(dimethylamine-co-epichlorohydrin-co-ethylenediamine).

The water soluble support may include at least one of a water soluble monomer and a water soluble polymer.

The water soluble monomer may include at least one of vinyl alcohol, vinyl acetate, acrylonitrile, and methyl methacrylate.

The water soluble polymer may include at least one of polyacrylamide, polyacrylic acid, poly(acrylamide-co-acrylic acid), polyvinylalcohol, and poly(sodium 4-styrenesulfonate).

The weight ratio of the ion conductive material to the water soluble support may be in a range of about 70:30 to about 30:70.

The composition may further include at least one solvent.

The solvent may include at least one compound from water, methanol, ethanol, dimethylacetamide, N-methyl-2-pyrrolidone, dimethylformamide, dimethyl sulfoxide, and tetrahydrofuran.

The amount of the solvent may be in a range of about 0 to about 100 parts by weight based on a total of 100 parts by weight of the ion conductive material and the water soluble support.

The composition may further include a thermal polymerization initiator or a photopolymerization initiator.

According to another aspect of the present invention, a method of preparing an ion exchange membrane includes: impregnating a porous substrate film having ion exchanging properties with the composition; and polymerizing the impregnated composition.

The porous substrate film may include at least one compound from a polyolefin, polytetrafluoroethylene (PTFE), polyetheretherketone, a polysulfone, a polyimide, and a polyamideimide.

According to another aspect of the present invention, an ion exchange membrane includes a polymer product of the composition described above.

The ion exchange membrane may have an ion conductivity of $1.0 \times 10^{-4}$ S/cm or more.

The ion exchange membrane may have a thickness of about 20 to about 100 μm.

The ion exchange membrane may be an anion exchange membrane.

The anion exchange membrane may allow at least one anion selected from the group consisting of $BF_4^-$, $PF_6^-$, $CF_3SO_3^-$, and $(CF_3SO_2)_2N^-$ to permeate therethrough.

According to another aspect of the present invention, a redox flow battery includes: a catholyte; an anolyte; and the ion exchange membrane disposed between the catholyte and the anolyte.

The ion exchange membrane may be an anion exchange membrane, and at least one of the catholyte and the anolyte is an organic electrolyte.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
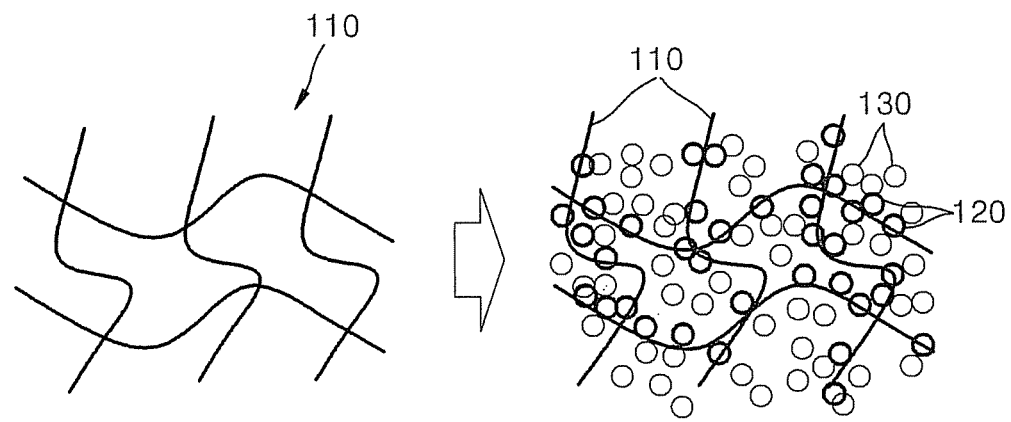
FIG. 1 is a diagram to explain a method of preparing an ion exchange membrane, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Expressions such as "at least one of," when preceding a list of elements, modify the entire list of elements and do not modify the individual elements of the list.

Hereinafter, an ion exchange membrane filling composition according to an embodiment of the present invention is described in detail.

An ion exchange membrane filling composition according to an embodiment of the present invention includes an ion conductive material and a water soluble support. The term "ion exchange membrane filling composition" used herein refers to "a composition that is used to fill a porous substrate having ion exchanging properties."

The ion conductive material is used in preparing an ion exchange membrane, which will be described later, to increase permeability of effective ions through the ion exchange membrane and reduce crossover of electrolyte components other than the effective ions. The term "effective ion" used herein refers to an electrolyte component that permeates through the ion exchange membrane to enable charging and discharging of a redox flow battery. Examples of the effective ions are $BF_4^-$, $PF_6^-$, $CF_3SO_3^-$, and $(CF_3SO_2)_2N^-$.

The ion conductive material may include at least one compound selected from the group consisting of an ion conductive monomer and an ion conductive polymer.

The ion conductive monomer may include a quaternary ammonium salt.

The quaternary ammonium salt may include at least one compound selected from the group consisting of compounds represented by Formulae 1 to 4 below:

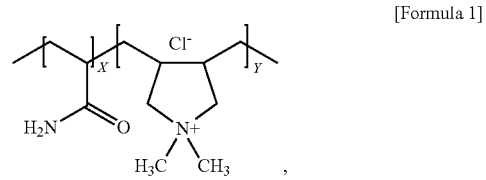

[Formula 1]

wherein in Formula 1, the ratio of x to y (x/y) may be in a range of about 0.1 to about 0.5. Also, the weight average molecular weight of the quaternary ammonium salt represented by Formula 1 may be in a range of about 100,000 to about 500,000.

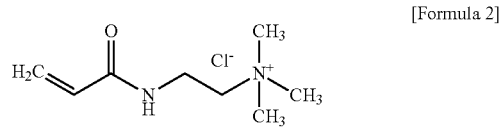

[Formula 2]

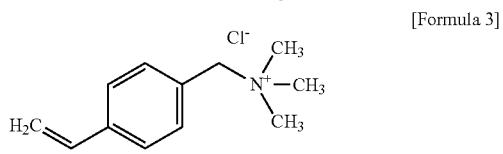

[Formula 3]

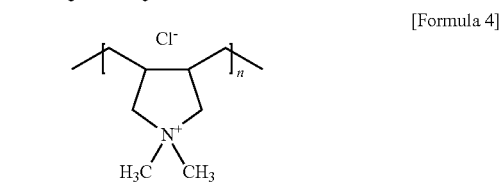

[Formula 4]

wherein in Formula 4, n is an integer of 100 to 10,000.

The ion conductive polymer may include at least one of poly(diallyldimethylammonium chloride), poly(acrylamide-co-diallyldimethylammonium chloride), and poly(dimethyl-amine-co-epichlorohydrin-co-ethylenediamine).

The water soluble support may compensate for hard and brittle properties of the ion conductive material or a polymer thereof to provide a flexible and tough ion exchange membrane.

The water soluble support may include at least one of a water soluble monomer and a water soluble polymer.

The water soluble monomer may include at least of vinyl alcohol, vinyl acetate, acrylonitrile, and methyl methacrylate.

The water soluble polymer may include at least of poly-acrylamide, a polyacrylic acid, poly(acrylamide-co-acrylic acid), polyvinylalcohol, and poly(sodium 4-styrenesulfonate).

The ion exchange membrane filling composition may include a combination of an ion conductive monomer and a water soluble monomer, a combination of an ion conductive monomer and a water soluble polymer, or a combination of an ion conductive polymer and a water soluble monomer.

If the ion exchange membrane filling composition includes a combination of an ion conductive monomer and a water soluble monomer, the final ion exchange membrane may include a homopolymer of the ion conductive monomer, a homopolymer of the water soluble monomer, and/or a copolymer of the ion conductive monomer and the water soluble monomer.

If the ion exchange membrane filling composition includes a combination of an ion conductive monomer and a water soluble polymer, the final ion exchange membrane may include a composite of a homopolymer of the ion conductive monomer and the water soluble polymer.

If the ion exchange membrane filling composition includes a combination of an ion conductive polymer and a water soluble monomer, the final ion exchange membrane may include a composite of the ion conductive polymer and a homopolymer of the water soluble monomer.

The weight ratio of the ion conductive material to the water soluble support may be in a range of about 70:30 to about 30:70. If the weight ratio of the ion conductive material to the water soluble support is within the range described above, an ion exchange membrane with a uniform composition and excellent ion mobility characteristics and film properties may be obtained (see FIG. 7).

The ion exchange membrane filling composition may additionally include at least one solvent.

The solvent may include at least one of water, methanol, ethanol, dimethylacetamide, N-methyl-2-pyrrolidone, dimethylformamide, dimethyl sulfoxide, and tetrahydrofuran.

The amount of the solvent may be in a range of about 0 to about 100 parts by weight based on a total of 100 parts by weight of the ion conductive material and the water soluble support. If the amount of the solvent is within the range described above, when the ion exchange membrane filling composition is polymerized, the drying time during a drying process may be reduced and a uniform film property may be obtained.

The ion exchange membrane filling composition may additionally include a thermal polymerization initiator or a photopolymerization initiator.

The thermal polymerization initiator may include at least one initiator selected from the group consisting of potassium persulfate, ammonium persulfate, sodium persulfate, ammonium bisulfate, sodium bisulfate, azobisisobutyronitrile, 1,1'-azobis(1-methylbutyronitrile-3-sodium sulfonate), and 4,4'-azobis(4-cyanovaleric acid).

The photopolymerization initiator may include at least one initiator selected from the group consisting of 2,2-dimethoxy-2-phenylacetophenone, 2-oxoglutaric acid, 1-hydroxycyclohexylphenyl methanone, and 2-hydroxy-2-methylpropiophenone.

The amount of the thermal polymerization initiator may be in a range of about 0.1 to about 0.5 wtppm based on a total weight of the ion conductive material and the water soluble support. If the amount of the thermal polymerization initiator is within the range described above, a polymer (that is, an ion exchange membrane) having a uniform composition may be obtained.

The amount of the photopolymerization initiator may be in a range of about 0.1 to about 0.5 wtppm based on the total weight of the ion conductive material and the water soluble support. If the amount of the photopolymerization initiator is within the range described above, a polymer (that is, an ion exchange membrane) having a uniform composition may be obtained.

Hereinafter, a method of preparing an ion exchange membrane, according to an embodiment of the present invention, is described in detail with reference to FIG. 1. FIG. 1 is a diagram to explain a method of preparing an ion exchange membrane, according to an embodiment of the present invention.

Referring to FIG. 1, a method of preparing an ion exchange membrane, according to the present embodiment of the present invention, includes impregnating a porous substrate film 110 having ion exchanging properties with an ion exchange membrane filling composition including an ion conductive material 120 and a water soluble support 130, and polymerizing the ion exchange membrane filling composition that is impregnated into the porous substrate film 110.

The thickness of the porous substrate film 110 may be 60 µm or less. If the thickness of the porous substrate film 110 is within the range described above, film resistance may be reduced.

The porous substrate film 110 may include at least one of a polyolefin, polytetrafluoroethylene (PTFE), polyetheretherketone, a polysulfone, a polyimide, and a polyamideimide. The porous substrate film 110 may have a pore size of about 0.01 to about 0.1 µm.

As an example of the polymerization, if the ion exchange membrane filling composition is thermally polymerized, the polymerization process may be performed at the temperature of about 40 to about 80° C. for about 2 to about 10 hours. In this case, during the polymerization process, a volatile material (for example, an organic solvent) that may be included in the ion exchange membrane filling composition may be removed.

As another example of the polymerizing, when the ion exchange membrane filling composition is photopolymerized, the polymerization process may be performed under irradiation of ultraviolet rays at room temperature (for example, about 20 to about 30° C.) for about 30 minutes to about 1 hour. As described above, when the ion exchange membrane filling composition is photopolymerized, the method of preparing an ion exchange membrane may further include drying after the polymerization. The drying may be performed at the temperature of about 40 to about 80° C. for 2 to 10 hours. In this case, during the drying, a volatile material (for example, an organic solvent) that may be included in the ion exchange membrane filling composition may be removed.

The method of preparing an ion exchange membrane may further include substituting a non-effective ion included in the ion conductive material or a polymer thereof 120 with the effective ion described above. The term "non-effective ion" used herein refers to an ion (for example, Cl⁻) that does not enter into the reactions of the present invention. The substitution may be performed by using a polycarbonate (PC)/triethylamine tetrafluoroborate (TEABF$_4$) solution, a polycarbonate (PC)/lithium bis(trifluoromethanesulfonyl) imide (LiTFSI) solution, or the like.

An ion exchange membrane prepared by using the method described above may have more ion channels, which constitute ion flow passages, than the porous substrate film 110.

Hereinafter, an ion exchange membrane according to an embodiment of the present invention is described in detail.

The ion exchange membrane according to the present embodiment includes a polymerization product of the ion exchange membrane filling composition described above.

The ion exchange membrane may have an ionic conductivity of $1.0 \times 10^{-4}$ S/cm or more (for example, about $2.0 \times 10^{-4}$ to about $5.0 \times 10^{-4}$ S/cm).

The ion exchange membrane may have a thickness of about 20 to about 100 μm.

The organic electrolyte may include a non-aqueous solvent, a supporting electrolyte, and a metal-ligand coordination compound.

The non-aqueous solvent may include at least one compound selected from the group consisting of dimethyl acetamide, diethyl carbonate, dimethyl carbonate, acetonitrile, γ-butyrolactone(GBL), propylene carbonate(PC), ethylene carbonate(EC), N-methyl-2-pyrrolidone(NMP), fluoroethylene carbonate, and N,N-dimethylacetamide.

The supporting electrolyte does not directly participate in the reactions and maintains a charge balance between a catholyte and an anolyte. The supporting electrolyte may include at least one compound selected from the group consisting of LiBF$_4$, LiPF$_6$, LiClO$_4$, LiCF$_3$SO$_3$, Li(CF$_3$SO$_2$)$_2$ N, triethylamine tetrafluorborate (TEABF$_4$), 1-ethyl-2-methylpyrazolium tetrafluoroborate (EMPBF$_4$), spiro-(1,1')-bipyrrolidium tetrafluoroborate (SBPBF$_4$), piperidine-1-spiro-1-pyrrolidinium tetrafluoroborate (PSPBF$_4$), tributylamine tetrafluoroborate (TBABF$_4$), and lithium bis(trifluoromethanesulfonyl)imide (LiTFSI).

The metal included in the metal-ligand coordination compound may include at least one metal selected from the group consisting of iron (Fe), nickel (Ni), cobalt (Co), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

The ligand included in the metal-ligand coordination compound may include at least one selected from the group consisting of dipyridyl, terpyridyl, ethylenediamine, propylenediamine, phenanthroline, and 2,6-bis(methylimidazole-2-ylidene)pyridine.

During oxidation and reduction, two or more electrons may move from the metal-ligand coordination compound.

The metal-ligand coordination compound may include at least one of compounds represented by the following formulae:

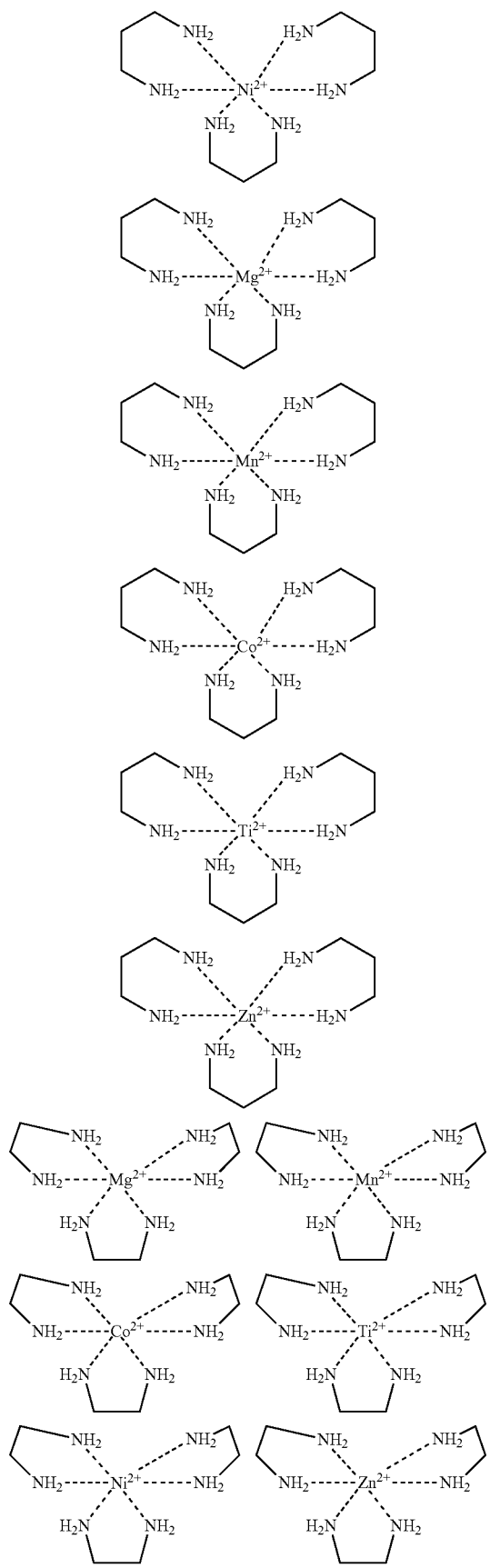

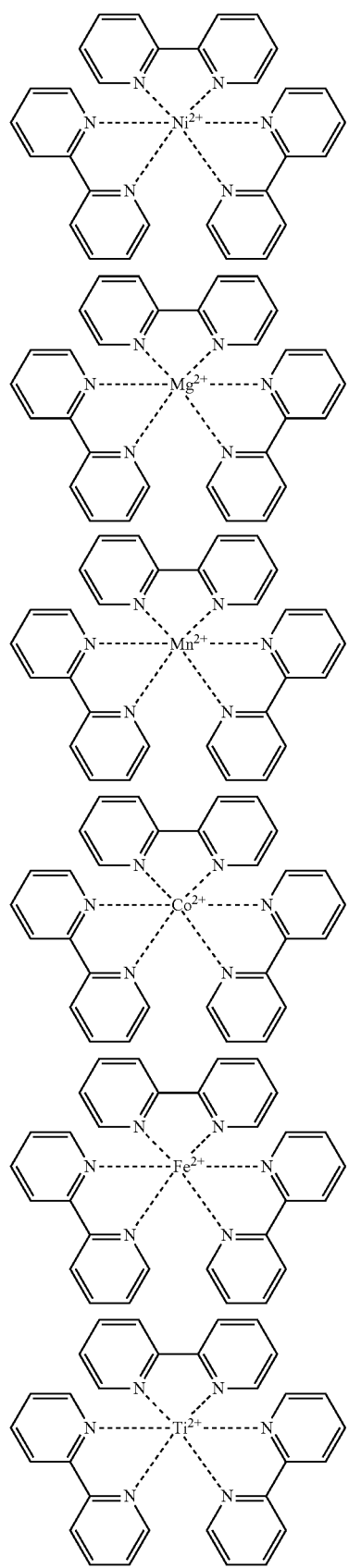
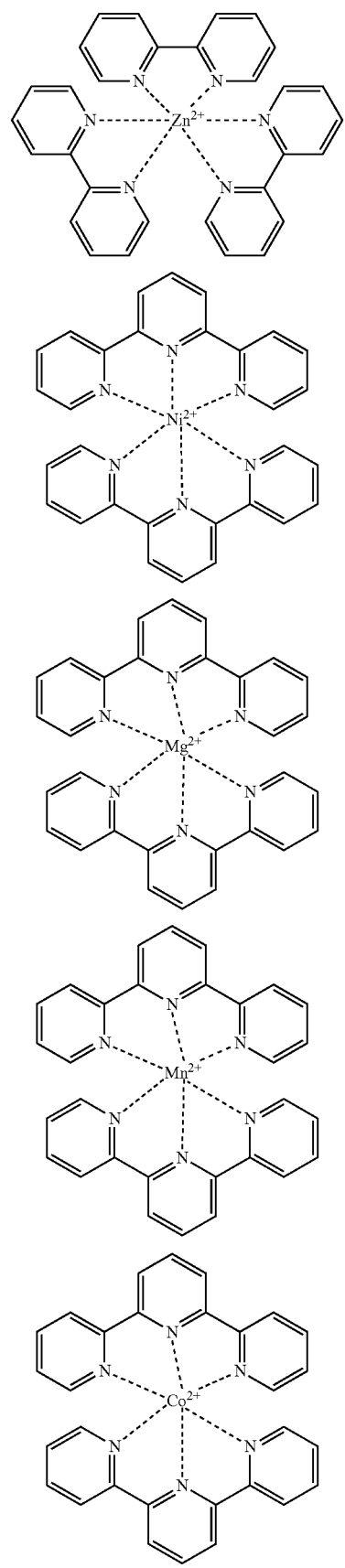

-continued
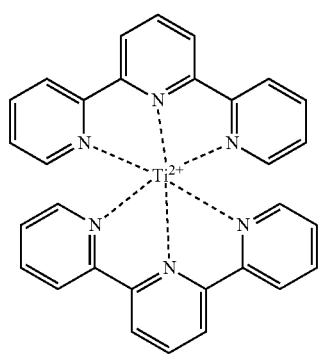
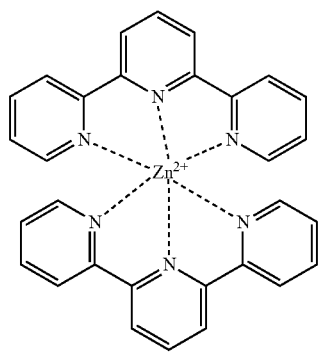
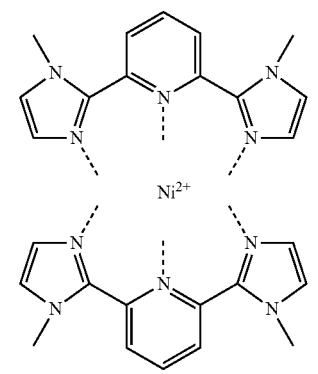
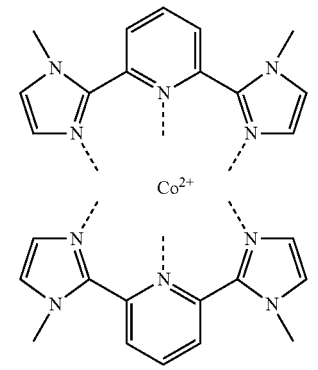
-continued
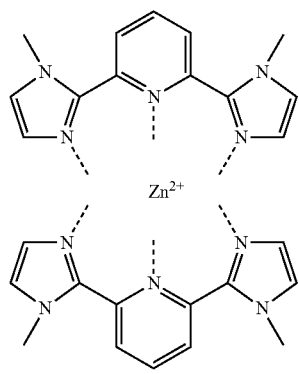
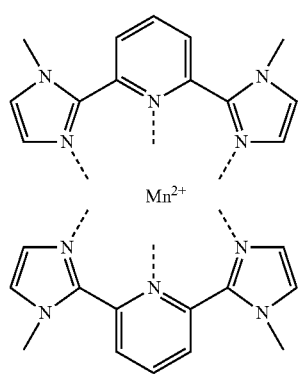
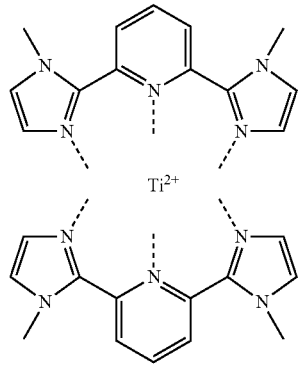
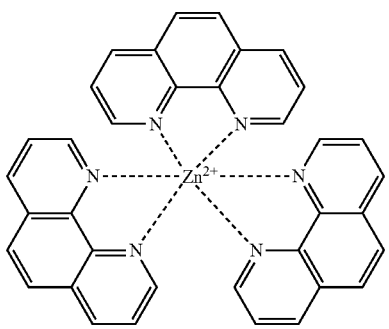

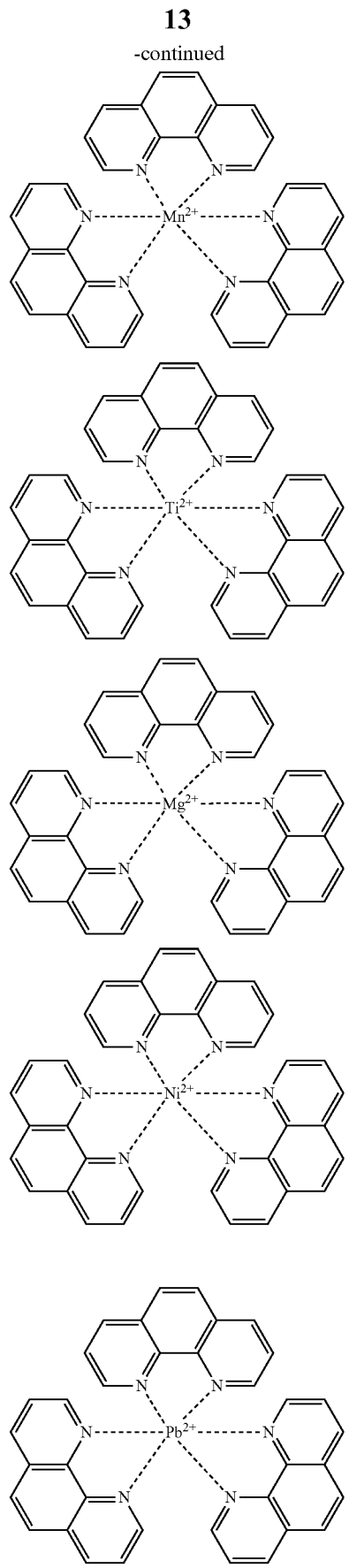

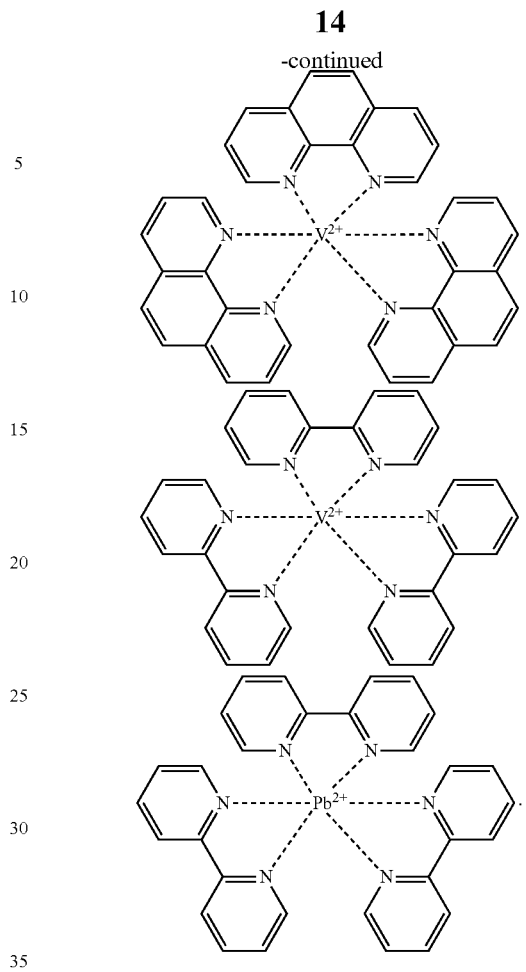

Figure 2:
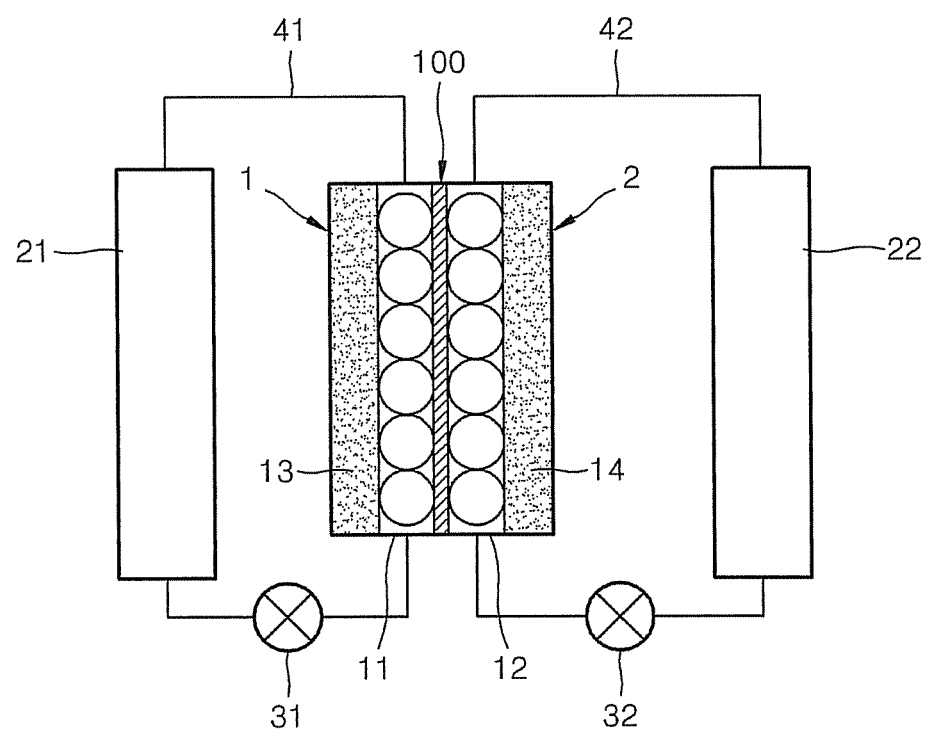
FIG. 2 is a schematic view of a redox flow battery according to an embodiment of the present invention.

Hereinafter, a redox flow battery according to an embodiment of the present invention will be described in detail with reference to FIG. 2. FIG. 2 is a schematic view of a redox flow battery according to an embodiment of the present invention.

Referring to FIG. 2, the redox flow battery according to the present embodiment includes a cathode cell 1, an anode cell 2, an ion exchange membrane 100 that separates the two cells 1 and 2, and the tanks 21 and 22 each communicating with the cells 1 and 2.

The cathode cell 1 may include a cathode 13 and a catholyte 11.

The anode cell 2 may include an anode 14 and an anolyte 12.

Charging and discharging may occur due to a redox reaction occurring at the cathode 13 and the anode 14.

Each of the cathode 13 and the anode 14 may include at least one material selected from the group consisting of carbon felt, carbon cloth, carbon paper, and metal foam.

At least one of the catholyte 11 and the anolyte 12 may be the organic electrolyte described above.

The ion exchange membrane 100 may allow only the effective ion (that is, a charge carrier ion of a supporting electrolyte) to permeate therethrough and may prevent permeation of other electrolyte components (that is, components other than the effective ion) included in the catholyte 11 and the anolyte 12. The ion exchange membrane 100 may be the ion exchange membrane described above. Also, the ion exchange membrane 100 may be an anion exchange membrane.

The cathode tank 21 stores the catholyte 11 and communicates with the cathode cell 1 via a tube 41. Likewise, the anode tank 22 stores the anolyte 12 and communicates with the anode cell 2 via a tube 42.

The catholyte 11 and the anolyte 12 circulate via pumps 31 and 32, respectively.

The operating principle of the redox flow battery is disclosed in KR 2011-0088881. KR 2011-0088881 is incorporated herein in its entirety by reference.

The redox flow battery may be used in, in addition to existing mobile phones, mobile computers, or the like, an application that requires high capacity and high power output, such as an electric vehicle. Also, the redox flow battery may be combined with an existing internal combustion engine, a fuel cell, a super capacitor, or the like for use in a hybrid vehicle, or the like. Also, the redox flow battery may be used in other applications that require high power output and high voltage.

Hereinafter, the present invention will be described in detail with reference to the following examples. However, the present invention is not limited to the examples.

EXAMPLES

Examples 1 to 4 and Comparative Example 1

(Preparation of Ion Exchange Membrane Filling Composition)

An ion conductive material, a water soluble support, a solvent (10 wt % N-methyl-2-pyrrolidone (NMP) aqueous solution), and a thermal polymerization initiator (azobisisobutyronitrile (AIBN)) were mixed at content ratios as shown in Table 1 below to prepare ion exchange membrane filling compositions (or ion exchange membrane forming compositions).

TABLE 1

| | Ion conductive material | | Water soluble support | | Solvent (NMP aqueous solution) (parts by weight) | Thermal polymerization initiator (AIBN) (wtppm[*3]) |
|---|---|---|---|---|---|---|
| | Type | Content (parts by weight) | Type | Content (parts by weight) | | |
| Example 1 | VBTMAC[*1] | 90 | PVA[*2] | 10 | 20 | 0.3 |
| Example 2 | VBTMAC | 70 | PVA | 30 | 20 | 0.3 |
| Example 3 | VBTMAC | 60 | PVA | 40 | 20 | 0.3 |
| Example 4 | VBTMAC | 40 | PVA | 60 | 20 | 0.3 |
| Comparative Example 1 | VBTMAC | 100 | Not used | | 20 | 10 |

[*1]: Vinylbenzyltrimethyl ammonium chloride (represented by Formula 3)
[*2]: Polyvinyl alcohol
[*3]: Based on a total weight of ion conductive material and water soluble support (Preparation of Ion Exchange Membrane)

A porous substrate film (Fumatech Company, FAP4) was washed with deionized water several times and then impregnated with a 2M KOH solution to sufficiently substitute Cl⁻ ions by OH⁻ ions. Then, the substituted porous substrate membrane was washed with deionized water. Thereafter, water was removed from the washed porous substrate film, followed by drying in a drying oven. Then, the pre-treated and washed porous substrate film was placed on a glass plate and then the ion exchange membrane filling compositions were coated thereon to a thickness of 60 μm. Then, the coated porous substrate film was placed in an oven and then dried at the temperature of 60° C. for 7 hours. Thereafter, a PC/TEABF$_4$ solution (concentration of TEABF$_4$: 0.5M) was used to substitute OH⁻ ions and Cl⁻ ions included in the dried porous substrate film with BF$_4$⁻ ions to complete the preparation of ion exchange membranes. In Comparative Example 1, however, the ion exchange membrane forming composition was directly coated on a glass plate to a thickness of 60 μm, and then drying and substitution processes as described above were performed to obtain an ion exchange membrane.

(Preparation of Redox Flow Battery)

A redox flow battery was manufactured as follows. As a cathode and an anode, an electrode that was prepared by heat treating carbon felt (Nippon Graphite, GF20-3, the thickness thereof was 3 mm, and the size thereof was 5 cm×5 cm) in the atmospheric condition at the temperature of 500° C. for 5 hours was used.

As an ion exchange membrane, the ion exchange membranes prepared above were used.

As a catholyte, 0.2M Fe (2,2'-bipyridine)$_3$(BF$_4$)$_2$ and 0.5M SBPBF$_4$ salt dissolved in a PC solvent were used, and as an anolyte, 0.1 M Ni(2,2'-bipyridine)$_3$BF$_4$ and 0.5M SBPBF$_4$ salt dissolved in a PC solvent were used.

In detail, an insulating material (PTFE film), a current collector (gold plate), and a bipolar plate (graphite) were stacked on a nut-integrated end plate. The bipolar plate had a gas leak hole. Thereafter, a square carbon felt electrode having a size of 5 cm×5 cm was cut in half to obtain two rectangular electrodes, and then, one of the electrodes was inserted into a concave surface of the bipolar plate to manufacture a cathode cell. Likewise, the other electrode was used to manufacture an anode cell. Then, 3 ml of the catholyte were injected into the cathode cell to complete the manufacture of the cathode cell. Also, 3 ml of the anolyte were injected into the anode cell to complete the manufacture of the anode cell. Thereafter, the cathode cell and the anode cell were arranged to face each other and then, four bolts into which Belleville springs were inserted were inserted passing through the two cells and then, the bolts were tightened in a diagonal sequence by using a torque wrench until the torque reached 1.5 Nm. After this assembling was completed, the remaining electrolytes were inserted through liquid injection pores of the respective electrodes, and then the pores were closed with a PTFE bolt, thereby completing the manufacture of a redox flow battery.

Comparative Example 2

A redox flow battery was manufactured in the same manner as in Examples 1 to 4 and Comparative Example 1, except that FAP4 manufactured by Fumatech Company was used as an ion exchange membrane without any treatment.

Evaluation Example

Evaluation Example 1

Measurement of Ion Conductivity of Ion Exchange Membrane

Ion conductivities of the ion exchange membranes of Examples 1 to 4 and Comparative Examples 1 to 2 were measured and the results are shown in Table 2 below. A SOLARTRON® 1260 impedance spectroscope manufactured by Solartron Analytical Company of Lloyd Instruments Group was used to measure the ion conductivity. Also, the measurement frequency range was in a range of about 0.1 Hz to about 1 MHz.

TABLE 2

|  | Example 1 | Example 2 | Example 3 | Example 4 | Comparative Example 1 | Comparative Example 2 |
|---|---|---|---|---|---|---|
| Ion conductivity ($10^{-4}$ S/cm) | 5.91 | 5.87 | 5.85 | 5.00 | 3.10 | 4.12 |

Referring to Table 2, it was confirmed that the ion exchange membranes prepared according to Examples 1 to 4 had higher ion conductivity than the ion exchange membranes of Comparative Examples 1 to 2.

Evaluation Example 2

Measurement of Cell Resistance of Redox Flow Battery

Figure 3:
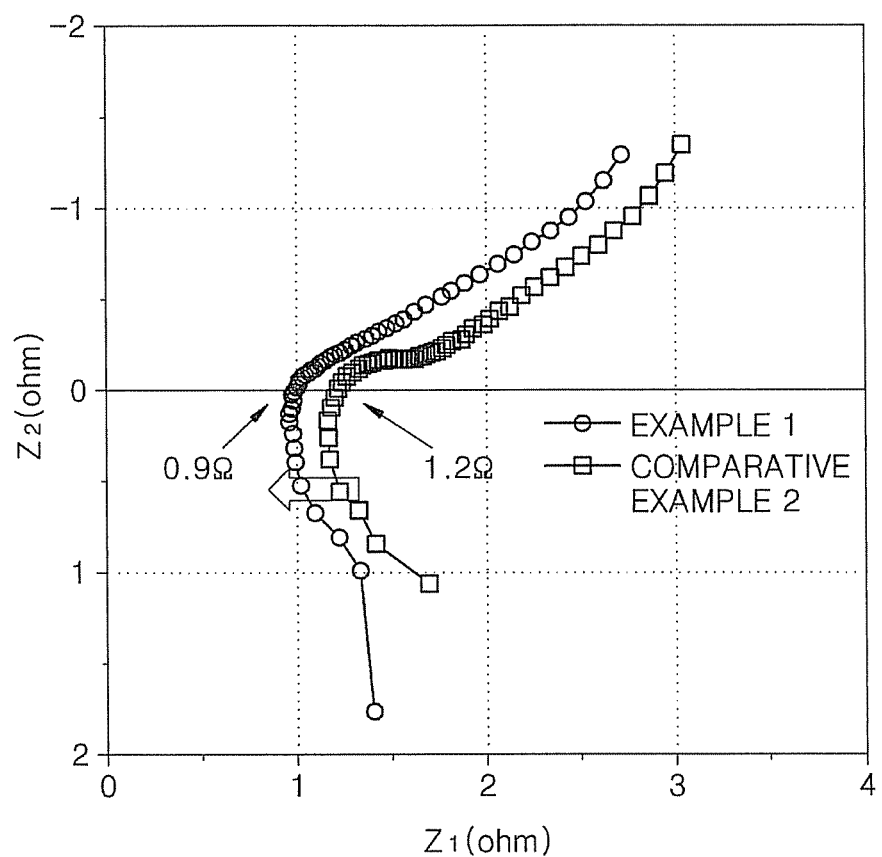
FIG. 3 shows impedance spectra showing cell resistance characteristics of redox flow batteries manufactured according to Example 1 and Comparative Example 2.

Impedance of the redox flow batteries prepared according to Examples 1 to 4 and Comparative Examples 1 to 2 was measured, and the results, that is, cell resistance are shown in Table 3 below. Also, impedance spectra of the redox flow batteries manufactured according to Example 1 and Comparative Example 2 are shown in FIG. 3. The impedance was measured by using the SOLARTRON® 1260 impedance spectroscope referenced above. Also, the measurement frequency range was in a range of about 0.1 Hz to about 1 MHz. In FIG. 3, $Z_1$ is resistance and $Z_2$ is impedance.

TABLE 3

|  | Cell resistance (ohm, Ω) |
|---|---|
| Example 1 | 0.90 |
| Example 2 | 0.89 |
| Example 3 | 0.92 |
| Example 4 | 0.98 |

TABLE 3-continued

|  | Cell resistance (ohm, Ω) |
|---|---|
| Comparative Example 2 | 1.95 |
| Comparative Example 2 | 1.17 |

Referring to Table 3 and FIG. 3, it was confirmed that the redox flow batteries manufactured according to Examples 1 to 4 had lower cell resistance than the redox flow batteries manufactured according to Comparative Examples 1 to 2.

Evaluation Example 3

Charging and Discharging Test

Figure 4:
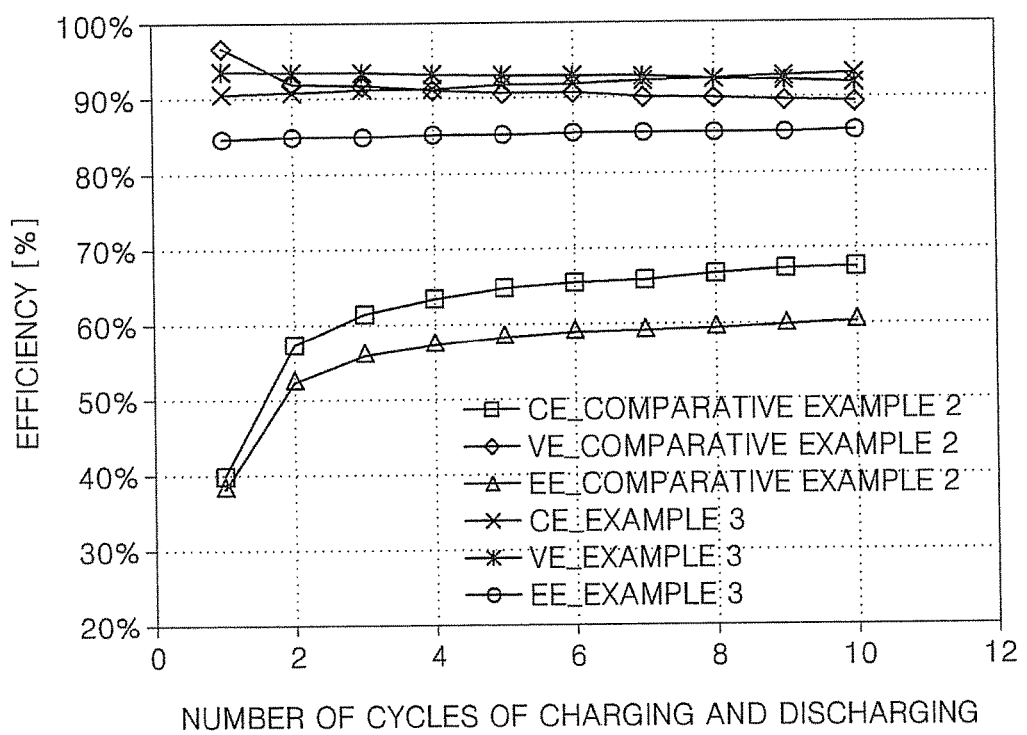
FIG. 4 is a graph of charging and discharging efficiency (CE), voltage efficiency (VE), and energy efficiency (EE) of redox flow batteries manufactured according to Example 3 and Comparative Example 2 with respect to number of cycles of charging and discharging.
Figure 5:
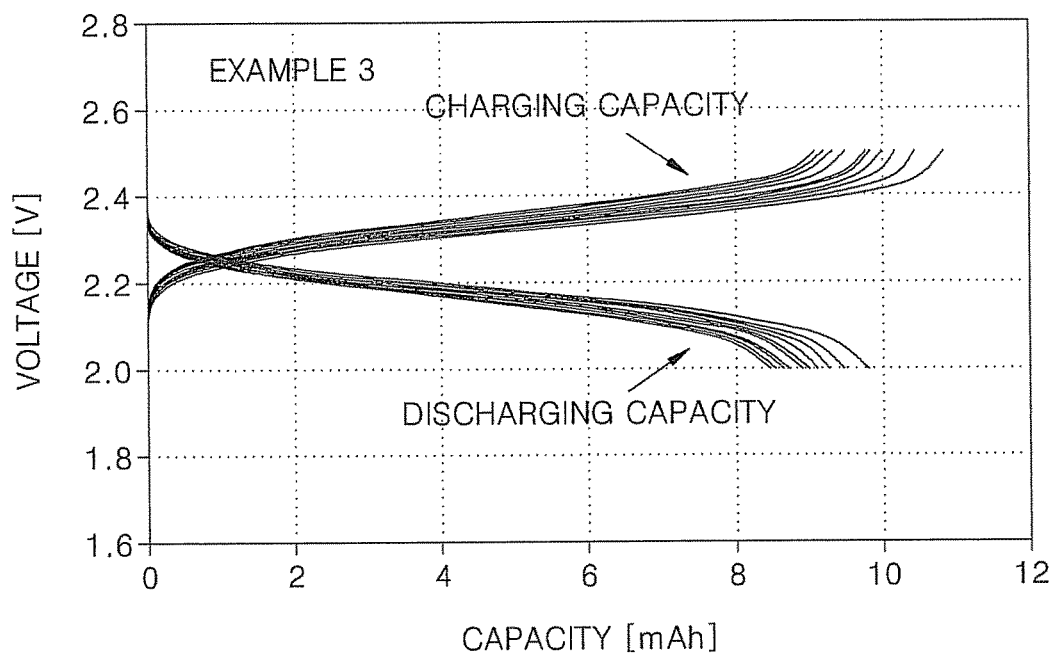
FIG. 5 is a graph of a charging capacity and a discharging capacity with respect to the number of cycles of charging and discharging of a redox flow battery manufactured according to Example 3.

Charging and discharging tests were performed at room temperature (25° C.) on the redox flow batteries manufactured according to the Examples 1 to 4 and Comparative Examples 1 to 2, and the results thereof are shown in Table 4, below and FIGS. 4 and 5.

Charging and discharging conditions were as follows: the redox flow batteries were charged with a constant current of 20 mA until the voltage reached 2.5 V, and then discharged with a constant current of 20 mA until the voltage decreased to 2.0 V. The charging and discharging were repeatedly performed 10 times.

In Table 4 below and FIG. 4, the charging and discharging efficiency (CE) refers to the percentage of the discharged charge amount divided by the charged charge amount, the voltage efficiency (VE) refers to the percentage of the average discharge voltage divided by the average charge voltage, and the energy efficiency (EE) refers to the product of the voltage efficiency and the charging and discharging efficiency. Also, in Table 4 below, the capacity reduction ratio refers to the percentage of the discharging capacity, that is, the discharged charge amount in the $10^{th}$ cycle divided by the discharged charge amount in the first cycle.

TABLE 4

|  | Example 1 | Example 2 | Example 3 | Example 4 | Comparative Example 1 | Comparative Example 2 |
|---|---|---|---|---|---|---|
| Charging and discharging efficiency (CE) (%) | 81 | 83 | 92 | 85 | — | 68 |

TABLE 4-continued

|  | Example 1 | Example 2 | Example 3 | Example 4 | Comparative Example 1 | Comparative Example 2 |
|---|---|---|---|---|---|---|
| Voltage efficiency (VE) (%) | 97 | 95 | 93 | 97 | — | 91 |
| Energy efficiency (EE) (%) | 79 | 82 | 85 | 81 | — | 60 |
| Capacity reduction ratio (%) | 18 | 16 | 14 | 18 | — | 3 |

Referring to Table 4, it was confirmed that the redox flow batteries manufactured according to Examples 1 to 4 had higher charging and discharging efficiency and, voltage efficiency and energy efficiency, and lower capacity reduction ratio than the redox flow batteries manufactured according to Comparative Examples 1 to 2. In the case of Comparative Example 1, however, physical properties of the ion exchange membrane were degraded after cell resistance was measured and thus, the charging and discharging test was not performed thereon.

Evaluation Example 4

Evaluation of Electrolyte Component Crossover

Following the charging and discharging test, a concentration of a non-effective ion (that is, Ni ion) passing through an ion exchange membrane was measured by using inductively coupled plasma (ICP), and the results thereof are shown in Table 5 below. In detail, after the charging and discharging test was completed, a concentration of a Ni ion present in the respective catholytes (that is, concentration of permeated electrolyte) was measured to evaluate the crossover of electrolyte components other than the effective ion.

TABLE 5

|  | Example 1 | Example 2 | Example 3 | Example 4 | Comparative Example 1 | Comparative Example 2 |
|---|---|---|---|---|---|---|
| Concentration of Permeated Electrolyte (wtppm) | 13.5 | 13.0 | 12.6 | 12.6 | — | 28.0 |

Referring to Table 5, the crossover of electrolyte components other than the effective ion in the redox flow batteries manufactured according to Examples 1 to 4 was reduced relative to that in the redox flow batteries manufactured according to Comparative Examples 1 to 2.

Evaluation Example 5

Evaluation of Water Soluble Support Efficacy

Figure 6:
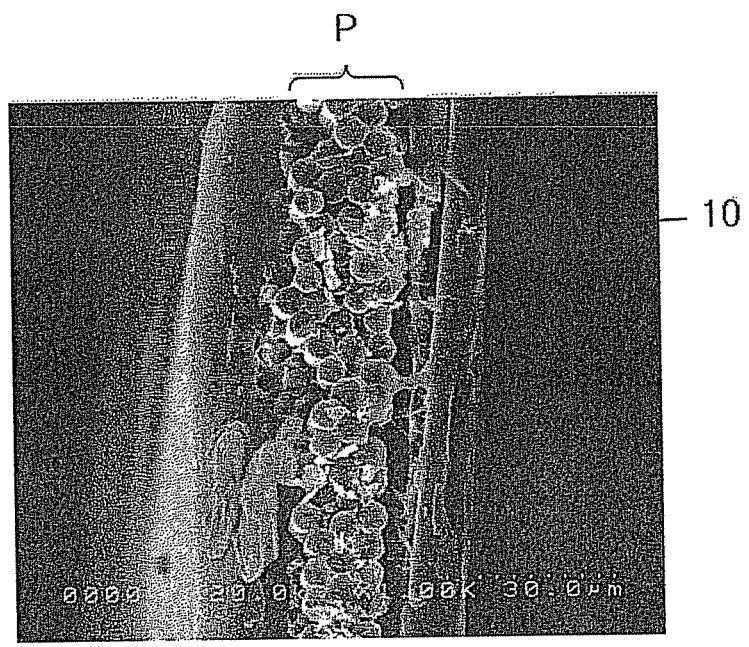
FIG. 6 is a scanning electron microscope (SEM) cross-sectional image of an ion exchange membrane (Comparative Example 1) manufactured by using only an ion conductive material.
Figure 7:
FIG. 7 is an SEM cross-sectional image of an ion exchange membrane (Example 3) manufactured by using an ion conductive material and a water soluble support.

The efficacy of a water soluble support on the formation of an ion exchange membrane was evaluated by referring to FIG. 6, that is, by evaluating an SEM cross-sectional image of the ion exchange membrane (Example 1) in which the weight ratio of the water soluble support/ion conductive material was 10/90, and by referring to FIG. 7, that is, by evaluating an SEM cross-sectional image of the ion exchange membrane (Example 3) in which the weight ratio of the water soluble support/ion conductive material was 40/60.

Referring to FIG. 6, it was confirmed that a polymer P of an ion conductive material was formed on only one surface of porous substrate film 10. On the other hand, referring to FIG. 7, the composite of a polymer of an ion conductive material and a water soluble support was uniformly formed in an ion exchange membrane. From these results, it was confirmed that the water soluble support improves impregnation properties of an ion exchange membrane filling composition with respect to a porous substrate film to aid formation of a redox flow battery having excellent film properties.

As described above, the ion exchange membranes according to the one or more of the above embodiments of the present invention may have optimized ion mobility characteristics and film properties in a non-aqueous system, that is, an organic system. Also, a redox flow battery including the ion exchange membrane has high charging and discharging efficiency, voltage efficiency and energy efficiency and a low capacity reduction ratio.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A redox flow battery comprising:
a catholyte;
an anolyte; and
an ion exchange membrane disposed between the catholyte and the anolyte,
wherein at least one of the catholyte and the anolyte is an organic electrolyte,
wherein the ion exchange membrane comprises a porous substrate film having ion exchanging properties, said porous substrate film being filled with the polymerization product of a composition comprising:

an ion conductive material; wherein the ion conductive material is at least one compound selected from the group consisting of an ion conductive monomer and an ion conductive polymer; wherein the ion conductive monomer or ion conductive polymer comprises a quaternary ammonium salt selected from the group consisting of compounds represented by Formulas 1, 2 and 4 below:

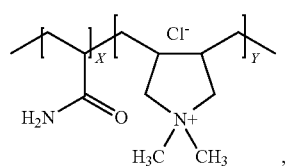

[Formula 1]

wherein in Formula 1, a ratio of x to y (x/y) is in a range of about 0.1 to about 0.5;

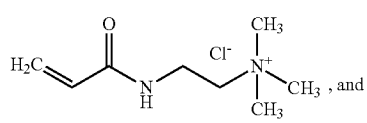

[Formula 2]

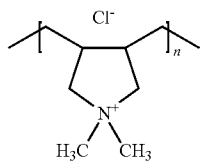

[Formula 4]

wherein in Formula 4, n is an integer of 100 to 10,000;

a thermal polymerization initiator or a photopolymerization initiator; and a hydrophilic support;

wherein the ion exchange membrane has a thickness of about 20 μm to about 100 μm.

2. The redox flow battery of claim 1, wherein the ion conductive polymer comprises at least one of poly (diallyldimethylammonium chloride), poly(acrylamide-co-diallyldimethylammonium chloride), and poly(dimethylamine-co-epichlorohydrin-co-ethylenediamine).

3. The redox flow battery of claim 1, wherein the hydrophilic support comprises at least one of a water soluble monomer and a water soluble polymer.

4. The redox flow battery of claim 3, wherein the water soluble monomer comprises at least one of vinyl alcohol, vinyl acetate, acrylonitrile, and methyl methacrylate.

5. The redox flow battery of claim 3, wherein the water soluble polymer comprises at least one of polyacrylamide, polyacrylic acid, poly(acrylamide-co-acrylic acid), polyvinylalcohol, and poly(sodium 4-styrenesulfonate).

6. The redox flow battery of claim 1, wherein a weight ratio of the ion conductive material to the hydrophilic support is in a range of 70:30 to 30:70.

7. The redox flow battery of claim 1, wherein the composition further comprises at least one solvent.

8. The redox flow battery of claim 7, wherein the solvent comprises at least one of water, methanol, ethanol, dimethylacetamide, N-methyl-2-pyrrolidone, dimethylformamide, dimethyl sulfoxide, and tetrahydrofuran.

9. The redox flow battery of claim 8, wherein an amount of the solvent is in a range of about 0 to about 100 parts by weight based on a total of 100 parts by weight of the ion conductive material and the hydrophilic support.

10. The redox flow battery of claim 1, wherein the ion exchange membrane has an ion conductivity of $1.0 \times 10^{-4}$ S/cm or more.

11. The redox flow battery of claim 1, wherein the ion exchange membrane is an anion exchange membrane.

* * * * *